Dec. 27, 1932.  B. F. JANCKE ET AL  1,892,107

HAIR WAVER

Filed Feb. 18, 1924  3 Sheets-Sheet 1

INVENTORS:
Benno F. Jancke,
Frederick Korf and
William Frederick Zentler.
By Attorneys,
Fraser Myers & Manby Dec. 27, 1932.  B. F. JANCKE ET AL  1,892,107
HAIR WAVER
Filed Feb. 18, 1924  3 Sheets-Sheet 2
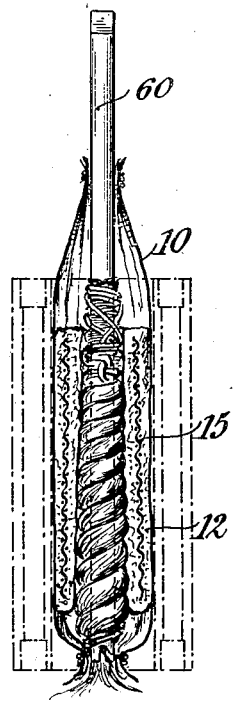
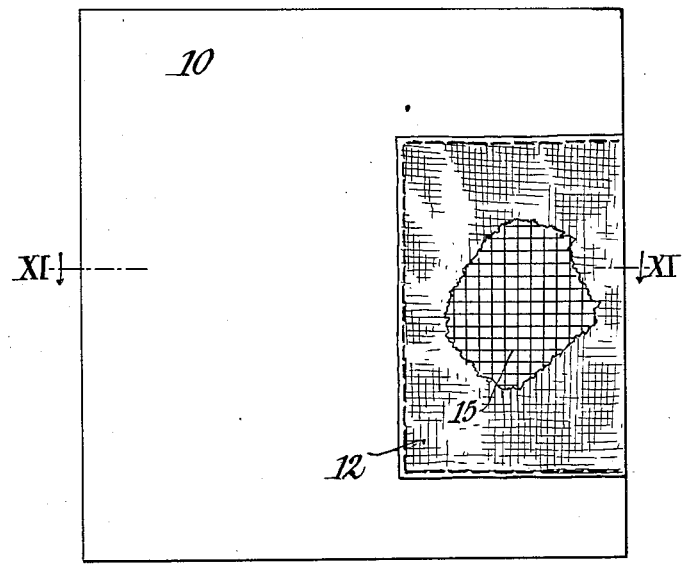
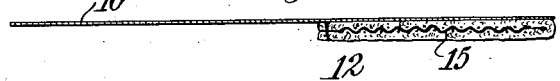
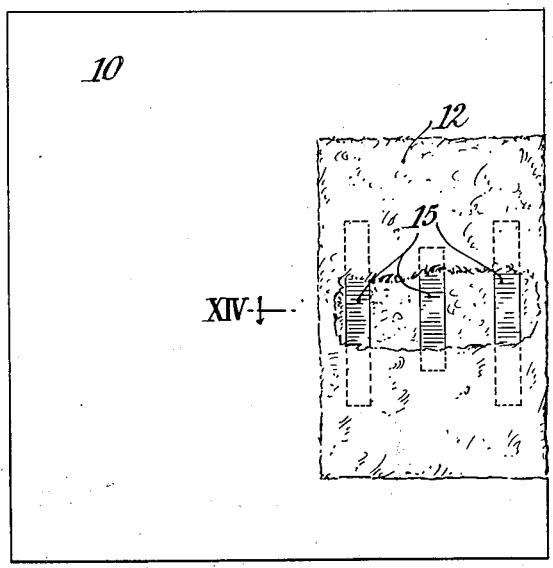
INVENTORS:
Benno F. Jancke,
Frederick Korf and
William Frederick Zentler.
By Attorneys, Dec. 27, 1932.  B. F. JANCKE ET AL  1,892,107
HAIR WAVER
Filed Feb. 18, 1924  3 Sheets-Sheet 3
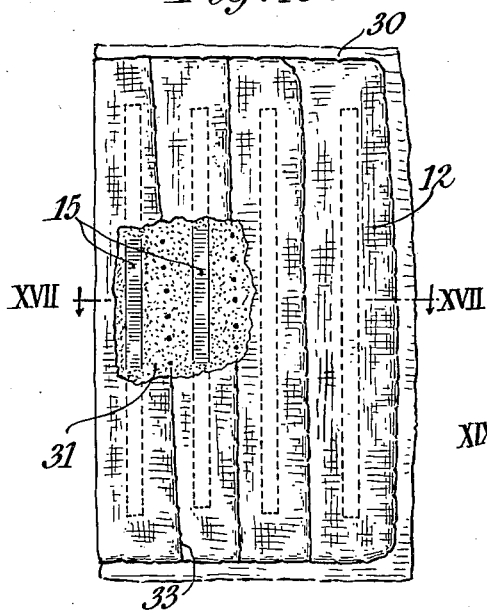
Fig. 16.
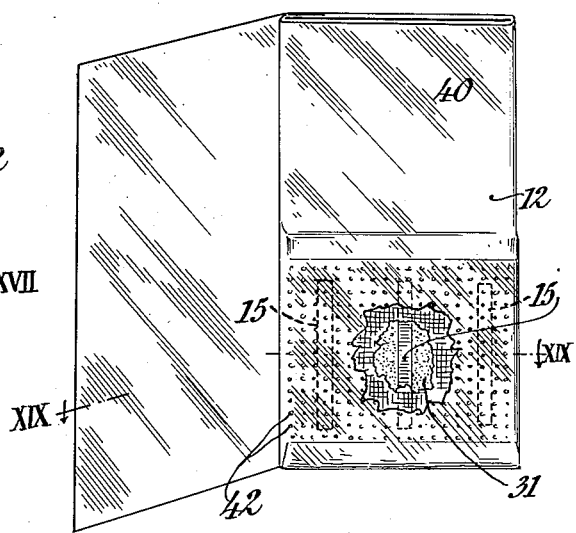
Fig. 18.
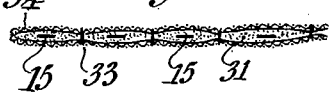
Fig. 17.
Fig. 19.
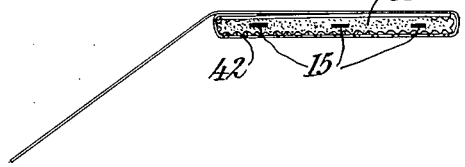
Fig. 20.
Fig. 21.
Fig. 22.
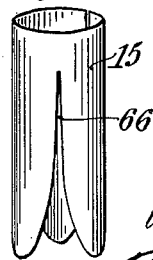
Fig. 23.
INVENTORS:
Benno F. Jancke,
Frederick Korf and
William Frederick Zentler.
By Attorneys,
Fraser Myers & Manley Patented Dec. 27, 1932

1,892,107

UNITED STATES PATENT OFFICE

BENNO F. JANCKE, OF NEW YORK, AND FREDERICK KORF AND WILLIAM FREDERICK ZENTLER, OF CRESTWOOD, NEW YORK, ASSIGNORS TO SHELTON-JANCKE CORPORATION, OF NEW YORK, N. Y., A CORPORATION OF NEW JERSEY

HAIR WAVER

Application filed February 18, 1924. Serial No. 693,605.

This invention relates to a method of waving hair and to articles used therein, and aims to provide improvements therein.

The invention provides a method of waving hair which simplifies the operation of preparing the hair for treatment, rendering such preparation more quickly and more easily carried out. Moreover, the preparations may be carried out with greater neatness than heretofore. The invention furthermore enables the hairdresser to exercise more readily than heretofore his skill in the treatment of hair because the method readily lends itself to special adaptations to the hair to be treated and the effects to be produced.

The invention further provides improved articles of the kind used for enclosing the hair during heat treatment, and for holding the moisture or chemical agents or solutions against or contiguous the hair during treatment thereof. These articles are of a very simple nature, easy to make and use, and contribute to improved results being obtained in the waving of hair. Certain forms of the invention are of especial advantage in the waving of hair by the method and appartus for waving hair invented by Benno F. Jancke, one of the present applicants, and disclosed in his application for patent filed November 15, 1923, Serial No. 674,888.

A number of embodiments of the articles of the present invention are illustrated in the accompanying drawings. Figs. 1 and 12 are useful in assisting in the description of the method.

Referring to said drawings,—

Fig. 5 being a view of a piece of blotting paper or other absorbent material, and Fig. 6 being a view of a metal tube;

Fig. 10 is a view of another embodiment of the article of the invention, showing parts adapted to be wound into the form of a composite tube, as shown in Fig. 12;

Fig. 11 is a sectional view on the line XI—XI, Fig. 10;

Fig. 12 is a view, partly in elevation and partly in section, showing one of the articles illustrated in Figs. 10 and 11, in the manner in which it is applied to the hair preparatory to waving;

Figs. 13 and 14 are views similar to Figs. 10 and 11, illustrating another embodiment of the article of the invention;

Fig. 15 is a view similar to Figs. 11 and 14, illustrating a further embodiment of the article of the invention;

Fig. 16 is a plan view of another embodiment of the article of the invention, parts being broken away to show the interior construction;

Fig. 17 is a sectional view on the line XVII—XVII, of Fig. 16;

Fig. 18 is a view similar to Fig. 16, of another embodiment of the article of the invention;

Fig. 19 is a sectional view on the line XIX—XIX of Fig. 18;

Fig. 20 is a view similar to Figs. 16 and 18, of yet another embodiment of the article of the invention, and Fig. 21 is a sectional view on the line XXI—XXI of Fig. 20;

Fig. 22 is a view illustrating the mode of use of the form of the invention illustrated in Figs. 20 and 21.

Fig. 23 is a view of a modified form of the metal part.

Figure 1:
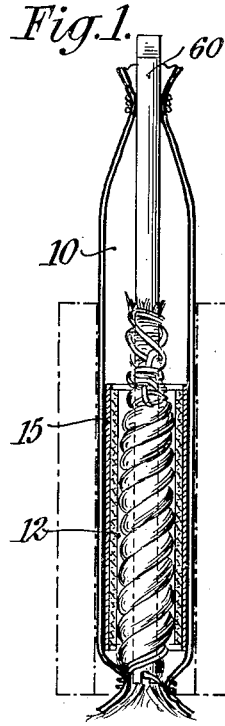
Figure 1 is a view showing a strand or lock of hair wound on a rod or waver, surrounded by a composite tube (shown in section), and this latter in turn surrounded by a so-called heater (also shown in section) in the manner that the hair and parts are prepared for carrying out permanent waving.

Referring to said drawings, numeral 10 designates a tube or envelope of any suitable kind; 12 an absorbent or carrier of any suitable kind for moisture, and preferably also for chemicals used in the process of hair waving; and numeral 15 designates a piece or pieces of metal of any suitable kind or form.

The envelope or tube 10 is preferably of a material which is impervious, or somewhat impervious to moisture. For example, it may be of parchment, sausage skin, fish skin, of a cellulose-ester, such, for example, as that known as cellophane, or the like. The most available material for this envelope is waxed paper. The tube may be stiff or collapsible. Tubes such as the ordinary cardboard tubes now largely used, which are closed by stuffing cotton in the ends, may be used.

The absorbent or moisture carrier 12 may be of any character which will retain moisture, which moisture is vaporized by heat in the hair treating process. Preferably, the carrier 12 is formed of absorbent material such as blotting paper or flannel, shown in Figs. 1 to 9, inclusive, and Figs. 10 and 11, or of asbestos.

It may be, however, of loose fibres, as a bat of cotton, shown in Figs. 13 to 15, a fabric bag, such as shown in Figs. 16, 17, 20, 21 and 22, or sheet material such as used for wrapping, such as cellophane, shown in Figs. 18 and 19.

The metal 15 may be of practically any metal or metals, and of any suitable form. It may be the heat-generating element, being energized for heating it by application of electric energy; or it may be otherwise heated. Preferably, it is of the character which combines good heat conductivity with magnetic properties. Ordinary iron or steel is the preferred material. It is preferred to use the metal in the form of a tube, as illustrated in Figs. 1 to 9, inclusive, or it may be in the form of gauze or netting, as illustrated in Figs. 10 to 12, inclusive, or in forms of strips or pieces, as illustrated in Figs. 13 and 14, and 16 to 22, inclusive; or in the form of filings, as illustrated in Fig. 15. In order that the metal or tube 15 may be pressed into enable the hairdresser to hold the strand of hair in applying the articles, the metal, when in sheet form, is preferably made collapsible, so that it can be pressed in against the hair. For example, as shown in Fig. 23, the tube may be of sheet metal, with scallops 65 at one end, and slits 66 preferably running nearly the length of the metal or tube 15. The metal part may be so made as to resume, or partly resume, its original form after being pressed in against the hair.

Figure 2:
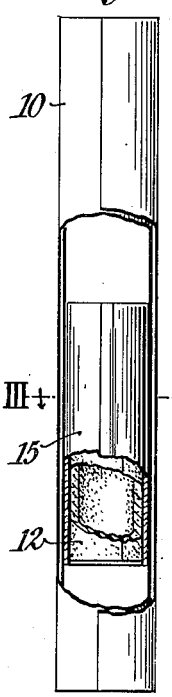
Fig. 2 is a view in elevation of a composite tube such as shown in Fig. 1, partly broken away to show inside parts.

In the preferred form of the invention the article is in the form of a composite piece, and preferably a tube comprising an envelope, a moisture and chemical carrier or support, and a metal piece, as illustrated in Figs. 1 and 2, and 10 to 15 inclusive. As stated, the parts are preferably put together in the form of a tube, as illustrated in Fig. 2, though they may to advantage be in a form such as illustrated in Figs. 10 and 13, convenient for forming into a tube. The envelope 10 preferably projects beyond the metal tube at one or both ends.

Figure 4:
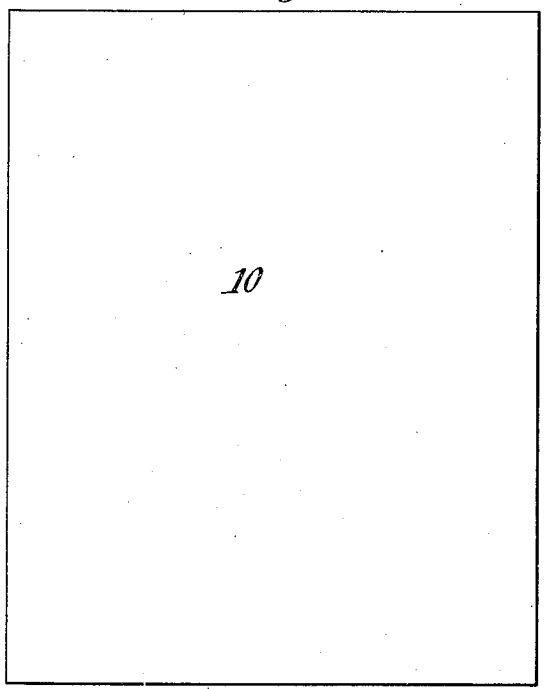
Figure 5:
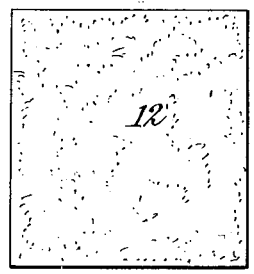

The material or piece which forms the envelope 10, Fig. 4, is preferably of a size to roll into a tube of about two plies thickness. The metal tube 15 may conveniently serve as a former around which the sheet 10 is wound. The moisture carrier 12 is ordinarily of a size that it will roll into a tube which will fit within the metal tube 15, and when of blotting paper is conveniently of only one-ply thickness when rolled, the edges of the piece abutting. When the metal tube 15 is not used, as in the construction illustrated in Fig. 7, the absorbent carrier is preferably of a diameter to fit close against the inner sides of envelope tube 10. The closeness of fit between the parts is preferably such as to serve to keep the parts of the composite tube together. The height or length of the metal or metal tube 15, and of the moisture carrier, is preferably about the same as the length of the coiled strand of hair to be waved, as shown in Figs. 1 and 12. Moreover, by varying the length of the metal or metal tube 15, the heat imparted to said metal may be localized along desired portions of the length of the coiled strand of hair, and thereby different effects in waving obtained.

The moisture carrier 12 is preferably made so as not to so closely surround the coiled strand of hair that it cannot slip off of the strand of hair after the waving is completed. As these moisture and chemical carriers become baked in the process of waving hair, the advantage of having the carrier in a form which can readily slip off of the coiled strand of hair, after the waving operation, is obvious.

Figure 7:
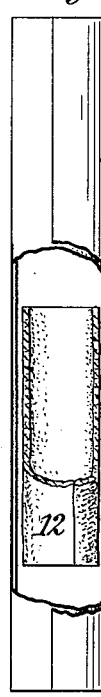
Fig. 7 is a view similar to Fig. 2, of a composite tube, but differing from the tube shown in Fig. 2 in that the metal tube does not constitute a part thereof.

The composite tube or piece may be constituted in the form of an envelope and absorbent material, such as flannel or blotting paper, as illustrated in Fig. 7. The invention is useful in connection with the ordinary resistance heater.

The absorbent material 12 may contain a chemical or chemicals, or may be without such chemicals, the chemicals and moisture being supplied thereto at the time of use by dipping the composite piece containing the absorbent part 12 in a solution of the desired chemical or chemicals. Where the absorbent material carries the desired chemical or chemicals, these are preferably applied thereto by dipping the absorbent material in a solution of the chemical or chemicals, and the moisture expelled by drying. The absorbent material is thus impregnated with the chemical or chemicals, and will withstand handling and transportation in the dry state without danger of detachment of the chemical or chemicals. When it is desired to use the impregnated composite tube or article, it is only necessary to dip the same into water, in which case the tube or article will thereupon be supplied with both the chemicals and moisture used in the process of waving hair.

Figure 8:
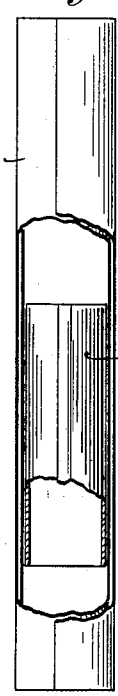
Fig. 8 is a view similar to Fig. 2, of a composite tube, but differing from the composite tube shown in Fig. 2, in that the piece or tube of absorbent material does not form a constituent part thereof.
Figure 3:
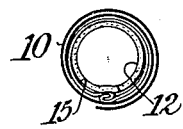
Fig. 3 is a horizontal section on the line III—III, Fig. 2.

As illustrated in Fig. 8, the composite tube may be made up of an envelope 10 and metal 15, preferably in the form of a tube. In this form of the article the ordinary pads now commonly in use for supplying the chemicals and moisture could be used.

Figure 9:
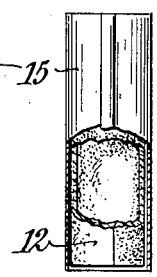
Fig. 9 is a view similar to Fig. 2, of a composite tube composed of the metal tube and the absorbent material or tube, but not including an envelope.
Figure 6:
Figs. 4, 5 and 6 are views showing separate parts of the composite tubes illustrated in Figs. 2 and 3, Fig. 4 being a view of a sheet of paper, preferably of a kind which is impervious, or substantially impervious to hot vapor.

The moisture and chemical carrier 12, preferably in the form of absorbent materials, such as flannel or blotting paper, and the metal 15, preferably in the form of a closed tube, as illustrated in Fig. 9, may advantageously be formed into a composite article, the envelope being supplied otherwise. For example, the article illustrated in Fig. 9 can be used to advantage in those forms of heaters in which a tube forms a part of the heater. In this case the composite article may be dipped into a solution prior to use or dipped into water, when previously charged, and then applied to the prepared strand of hair, and the whole then enclosed by either a separate envelope such as heretofore commonly in use, or by a heater of the type comprising an enclosing tube.

The so-called pads, heretofore commonly in use, may be made to advantage by combining therewith metal in any suitable form, as illustrated in Figs. 16 to 22 inclusive. As shown in Figs. 16 and 17, the pad comprises two or more plies of fabric 30 between which is enclosed a chemical or chemicals 31 of any desired kind, and, according to the present invention, pieces of metal 15 are also enclosed between the plies of fabric 30. To prevent shifting of the chemicals between the plies of fabric 30, this fabric is sometimes stitched, as indicated at 33, to form a plurality of compartments 34. In such case, the pieces of metal 15 are conveniently distributed in the several compartments 34.

In Fig. 18 the pad is shown as composed of a package of sheet material 40, such as cellophane, containing within the package a chemical or chemicals 31 of a suitable character. The envelope is perforated, as indicated at 42, in such manner as would admit of the entrance of moisture and the exit of vapor. According to the present invention, metal 15, conveniently in the form of strips, is placed in the package so as to be enclosed within the material 40.

As illustrated in Figs. 20 to 22, the pad may be in the form of a long strip 50 of suitable material such as fabric, of one or more plies and containing between the plies the desired chemical or chemicals 31, and also a metal 15 preferably in the form of a long strip.

*Method.*—In carrying out our improved method, the hair is prepared for treatment in any suitable manner, strands thereof being tightly wound and secured on a rod 60, as illustrated in Figs. 1 and 12.

According to the present invention, a composite tube, one part of which consists of absorbent material, such as flannel, blotting paper, or the like, is dipped into a solution containing chemicals, and applied around the hair. The composite tube also preferably includes an enclosing tube, which acts to support the absorbent tube or material; also serves as a convenient means for holding the composite tube in the act of dipping the tube into the solution. By holding the envelope at one end, it is not necessary to dip the hands into the solution. Any excess of solution readily drains off. The tube is then placed around the prepared strands of hair on the rod 60. Practically the only manipulation required is the placing of the tube over the rod and the hair thereon. The ends of the tube are then closed in the customary manner, as by pressing in the ends of a collapsible tube and tying the closed-in ends, or by filling the ends of a stiff tube with cotton or the like.

Thereafter if external heat is used, the heater is placed over the envelope as shown in dotted lines in Figs. 1 or 12, and heat applied to produce the vaporization of the moisture or chemical solution, and the waving of the hair. By employing an absorbent material and dipping it just prior to the treatment of the hair, the tube or article may be dipped into solutions of various character, depending upon the nature of the hair to be treated. It thus enables the expert hairdresser to exercise his skill in the treatment of hair by altering the contents of the carrier 12 of absorbent material to best suit the character of the particular hair to be waved. Moreover, the manipulation of the hair by the hairdresser may be very quickly and neatly performed by practicing the method of the present invention. The heating first vaporizes the solution and steams the hair, and later dries or partly dries the hair, the progress being observable by the operator by the darkening or baking of the external envelope, as usual.

The moisture carrier 12 being of a form which readily slips on and off of the coiled strand of hair, as hereinbefore explained, permits of the quick and ready removal of the articles used around the hair. It is not necessary to crush the moisture and chemical carrier, as now generally practiced, and thereby the time of freeing the waved hair after the heat treatment is very much shortened.

The metal 15, as a part of the article, acts as an inductor or conductor of heat from an outside source, and, being close to the moisture carrier and the hair, accelerates the production of vapor and the waving of the hair. When heat is externally applied, the metal 15 uniformly distributes the heat and radiates and conducts it inwardly to the enclosed moisture carrier to uniformly steam the hair. In the case of a transmission of energy for heating through space by induction, the metal 15 serves as a medium in which heat is developed by induced electrical currents and molecular action produced therein. The method and apparatus in which the metal acts as an inductor or developer of heat, are not claimed herein, but in said Jancke application.

The invention may receive other embodiments and be carried out in other specific modes of procedure than those herein specifically illustrated and described.

What we claim is:

1. An article for use in hair waving adapted to enclose a prepared strand of hair, consisting of an inner absorbent layer adapted to be saturated with a solution, a metal element closely surrounding said layer adapted to generate heat on excitation from a source of electrical energy, whereby the heat is applied close to the saturated absorbent, and a flexible envelope enclosing the absorbent and adapted to retain and confine the vapors generated by the heat.

2. An article according to claim 1, the metal element being a tube.

3. An article according to claim 1, the metal element being of magnetic material adapted to be heated by hysteresis.

4. A tubular artictle according to claim 1, consisting of an inner absorbent layer adapted to be saturated with a solution, a tubular metal element closely surrounding said layer adapted to generate heat on excitation from a source of electrical energy, whereby the heat is applied close to the saturated absorbent, and a flexible tubular envelope enclosing the absorbent and adapted to retain and confine the vapors generated by the heat.

5. An article for use in hair waving adapted to enclose a prepared strand of hair, comprising a readily collapsible metal heat-radiating element, with an outer enclosing envelope, and an inner absorbent layer adapted to be saturated with a solution.

6. An article for use in hair waving adapted to enclose a prepared strand of hair, comprising a collapsible non-metallic tubular envelope, a metallic heat-generating element in tubular form within said envelope, and an absorbent medium within said metallic element.

7. An article for use in hair waving adapted to enclose a prepared strand of hair, comprising an enclosing tube of paper, a heat-generating metal tube in said enclosing tube, and an absorbent medium within said metal tube.

8. An article for use in hair waving, adapted to be placed around a prepared strand of hair, including a heat-generating metal part having slits in one end to render it readily collapsible.

9. A tubular article for use in hair waving adapted to enclose a prepared strand of hair, comprising a metallic tube adapted to distribute and inwardly radiate heat, an absorbent material within such tube, and a tubular envelope enclosing the metallic tube.

10. An article according to claim 9, with the external envelope projecting beyond the metallic tube.

11. A tubular article for use in hair waving adapted to enclose a prepared strand of hair, comprising a metallic tube adapted to distribute and inwardly radiate heat, an absorbent material within such tube, and an external layer of paper enclosing said metallic tube.

12. A tubular article for use in hair waving adapted to enclose a prepared strand of hair, comprising a metallic tube adapted to inwardly conduct and radiate externally-applied heat, an absorbent material within the metallic tube, and an outer flexible tube surrounding the metallic tube.

13. A tubular article for use in hair waving adapted to enclose a prepared strand of hair, comprising a tubular metallic member, an absorbent material within it, and an exterior envelope surrounding both.

14. An article for use in hair waving, adapted to enclose a prepared strand of hair, comprising a tubular portion of metal with an exterior wrapper of paper.

15. An article for use in hair waving, adapted to enclose a prepared strand of hair, comprising a composite tube of metal and paper adapted to enclose the hair, such metallic portion adapted to inwardly conduct and radiate externally-applied heat.

16. An article for use in hair waving, adapted to enclose a prepared strand of hair, comprising a composite tube of metal and paper having paper inside of and exterior to the metallic portion.

17. A tubular container for enclosing a strand of hair during the heating operation of a waving process, adapted to conduct heat applied to its exterior surface through its walls to communicate such heat to the strand of hair enclosed by the tube, the tube walls having a thermal conductivity, such that its exterior surface will have substantially the same temperature as its interior surface.

18. A container for enclosing a strand of hair during the heating operation of a waving process, and adapted to communicate extraneously applied heat through its walls to the strand of hair operated upon, comprising a sheet of metallic material.

19. A container for enclosing a strand of hair during the heating operation of a waving process, and adapted to communicate extraneously applied heat through its walls to the strand of hair operated upon, comprising a sheet of pliable metallic material.

20. The method of processing a treated wound strand of hair comprising confining the prepared strand with moisture within a metallic wrapper and heating the confined hair and moisture by heat applied to the wrapper extraneously thereof.

In witness whereof, we have hereunto signed our names.

BENNO F. JANCKE.
FREDERICK KORF.
WILLIAM FREDERICK ZENTLER.